United States Patent Office.

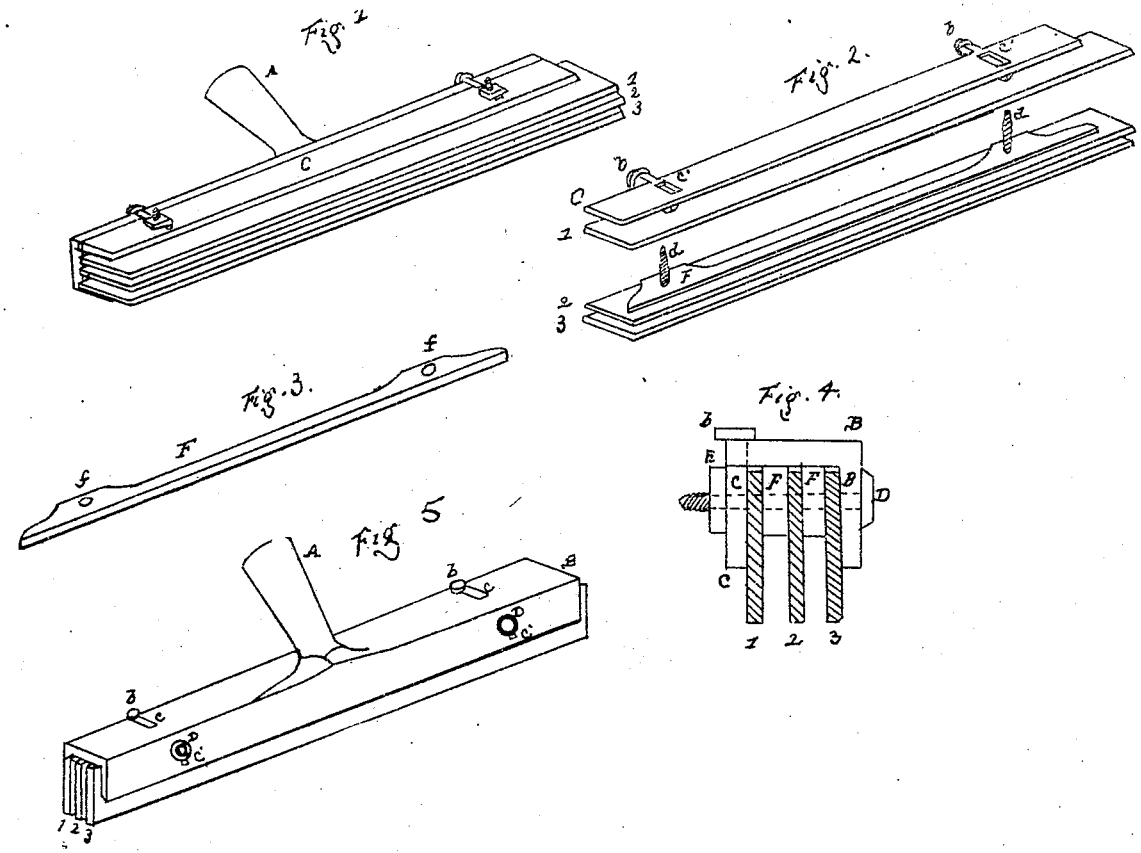

HENRY B. GREBINGER, OF MILLERSVILLE, PENNSYLVANIA, ASSIGNOR TO HIMSELF, B. E. KENDIG, AND C. B. HERR, OF SAME PLACE.

Letters Patent No. 75,154, dated March 3, 1868.

---

IMPROVED SCRUBBER-HOLDER.

---

The Schedule referred to in these Letters Patent and making part of the same.

---

TO ALL WHOM IT MAY CONCERN:

Be it known that I, HENRY B. GREBINGER, of Millersville, in the county of Lancaster, and State of Pennsylvania, have invented a new and improved Mode for Constructing Scrubber-Holders; and I do hereby declare that the following is a full and exact description thereof, reference being had to the accompanying drawings, making a part of this specification, in which—

Figures 1 and 5 are perspective views of the holder, with the India-rubber strips and separators in place.

Figure 2 shows the parts partially detached.

Figure 3 shows one of the intervening strips.

Figure 4 is an end view or cross-section.

The nature of my invention consists in providing intermediate holders or clamps for three or more strips of gum-elastic, in adjustable slots in the top and side-piece, by means of headed bolts and screw-burrs, in a horizontal position, so that three or more scrubbing single strips may be inserted, or in pairs, to give greater stiffness and scrubbing power.

To enable others skilled in the art to make and use my invention, I will now more fully describe its construction, clearly shown by the drawings.

I construct the top, B, and one side, at right angles to it, cast in one piece, with a central socket, A, for a handle. The outer edge of the top, B, has a slot, $c$, say one-sixth of the entire length in from each end. The vertical side-piece C, fig. 2, has a headed projecting lug, $b$, which fits into the open side-slot $c$, on the edge of B, in which it is made adjustable. This side-piece C has also a slot, $c'$, behind the lug $b$, in which the screw-bolt D is made adjustable, as well as in a similar side-slot in the vertical portion or side of B. There are also two or more pieces, F, (fig. 3,) with holes, $f$, for the screw-bolt D. The strips of gum, 1, 2, 3, either single or double, are perforated for the screw-bolt D. The scrubber is combined, ready for use, by laying the strip or strips of gum, 3, into the angle of the head A B; on top of that a perforated separator, F; then gum 2 and strip F, (No. 2,) followed by strip 1 and the outer side-piece $c$. The gum and separating-strips F are pushed in as far up as possible, and the bolts D passed through the slots and perforations in the gum and separators, and the burr or nut E fastened on, to hold them tightly together, as shown by fig. 4, only that the dividing-strips F are shown proportionately thicker than is requisite. As the gum wears off, it can be brought out from time to time, as far as the external slots in the holder will allow, together with the intervening strips, and thus be kept adjusted to the original length or width of the projecting parts of the gum.

I am aware that right-angled tops, with a side-strip and bolts, are not new, and that the entire head, forms a deep groove, in which a rod holds the gum, which rod projects through the top, and is held by screw-nuts. I am also aware that scrubbers are made with corrugated sides, in order to stiffen the gum; but there are objections to these several modes, which, it is believed, are obviated by clamping together three or six strips of gum, in the manner specified, which presents all the stiffness wanted, and a greater scrubbing-surface. What I believe to be new is, the introduction of the separating-strips F, with their perforations $f$, and the arrangement of the three or more plies of gum in the manner set forth; therefore,

What I claim as my invention, and desire to secure by Letters Patent, is—

The intervening pieces F, with their perforations $f$, in combination with the slotted sides B $c$, headed screw-bolt D, all arranged and applied in the manner and for the purpose specified.

HENRY B. GREBINGER.

Witnesses:
TOBIAS KAUFFMAN,
ELIZABETH KAUFFMAN.